United States Patent [19]

Hall et al.

[11] 3,723,465

[45] Mar. 27, 1973

[54] DIBENZOPYRANS, THEIR ISOMERIC FLUORENOLS AND IBENZOTHIOPYRANS

[75] Inventors: Walter L. Hall, Mount Vernon, Ind.; Jimmy L. Webb, Jonesville, N.Y.

[73] Assignee: General Electric Company, Schenectady, N.Y.

[22] Filed: May 26, 1971

[21] Appl. No.: 147,164

[52] U.S. Cl..............260/328, 260/335, 260/607 R, 260/619 R, 252/404, 252/406
[51] Int. Cl.......C07c 39/12, C07d 65/16, C07d 7/42
[58] Field of Search.....260/328, 345.3, 514, 619, 73, 260/335, 74

[56] References Cited

UNITED STATES PATENTS 3,388,136   6/1968   Taylor..............................260/345.3

Primary Examiner—Harry I. Moatz
Attorney—James W. Underwood, Joseph T. Cohen, Paul A. Frank, Charles T. Watts, Frank L. Neuhauser, Oscar B. Waddell and Joseph B. Forman

[57] ABSTRACT

In a very strongly acidic liquid media, 2,6-diphenylphenol and 2,6-diphenylthiophenol react with most aldehydes and ketones to produce dibenzopyrans or dibenzothiopyrans. The dibenzopyrans, but not the dibenzothiopyrans, can be isomerized to their corresponding fluorenols. Both the pyran and thiopyran ring can be cleaved to convert these materials into phenols which differ from starting phenols because one of the o-phenyl substituents, itself, now has an ortho substituent characteristic of the aldehyde or ketone reactant. Both these phenols and the fluorenols, being phenolic compounds are useful as antioxidants, stabilizers, etc.

14 Claims, No Drawings

DIBENZOPYRANS, THEIR ISOMERIC FLUORENOLS AND IBENZOTHIOPYRANS

This invention relates to novel dibenzopyrans and dibenzothiopyrans and the isomeric fluorenols of the dibenzopyrans. More particularly, this invention relates to the dibenzopyrans and dibenzothiopyrans having the formula,

A.

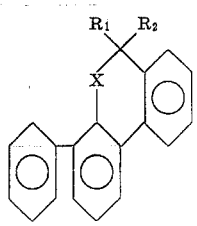

and the fluorenol isomers of the dibenzopyrans having the formula,

B.

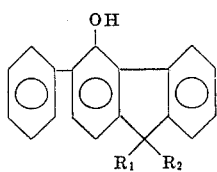

where X is oxygen or sulfur, $R_1$ and $R_2$, taken together with the carbon atom to which both are attached, from a cyclohexyl ring, including a lower alkyl substituted cyclohexyl ring and, in addition, separately, $R_1$ is hydrogen or lower alkyl free of a tertiary α-carbon atom and $R_2$ is lower alkyl free of a tertiary α-carbon atom, phenyl, lower alkyl substituted phenyl and, when X is sulfur and $R_1$ is hydrogen, carboxyl.

In our studies of the chemistry of 2,6-diphenylphenol, we found that this phenol, unlike almost all other phenols, did not react with aldehydes or ketones in the presence of the usual mineral acid catalysts to form bisphenols. This confirmed the findings of J. Kahovec and J. Popisil, "Coll. Czechoslov. Chem. Commun.", 34, 2843 (1969) that this phenol did not react with acetone with the usual acid catalysts. Generally, no useful reaction occurs unless an inert medium having no more than 5 percent water by volume and whose acid strength, as measured on the Hammett $H_o$ scale, is at least as strong as trifluoroacetic acid. Under these very strong conditions, the particular product is dependent on the acid strength, the aldehyde or ketone and whether the phenol is 2,6-diphenylphenol or its thio isologue 2,6-diphenylthiophenol.

As disclosed and claimed in our copending application Ser. No. 147,165, filed concurrently herewith and assigned to the same assignee as the present invention, formaldehyde and acetaldehyde, preferably as their polymeric modifications, react in the presence of formic acid and trifluoroacetaldehyde, preferably as its hydrate, 1,1,1-trifluoroacetone, hexafluoroacetone and glyoxylic acid react under the above stronger acid conditions with 2,6-diphenylphenol to form very good yields of the claimed bisphenols. These same aldehydes and ketones did not give bisphenols with 2,6-diphenylthiophenol. Instead, the products were bisthioethers (thioacetals) except in the case of glyoxylic acid where the product was a di-benzothiopyran.

Both 2,6-diphenylphenol and its thio isologue yield dibenzopyrans or dibenzothiopyrans with other aldehydes and ketones except for all-aromatic ketones which do not react at all. These dibenzopyrans, dibenzothiopyrans and the isomeric fluorenols of the dibenzopyrans are new chemical compounds and are the subject of the present invention. We further discovered that bidenzopyrans, dibenzothiopyrans and the isomeric fluorenols of the dibenzopyrans could also be obtained under these conditions with many phenols or thio-phenols having an o-phenol substituent. Since the scope of this reaction is broader than the preparation of the chemical compounds of this invention, this reaction is the subject matter of our copending application, Ser. No. 147,163, filed concurrently herewith and assigned to the same assignee as the present invention. This copending application is hereby incorporated by reference for a more detailed description of the scope of the various parameters which can be used in making the compounds of the present invention.

In general, the compounds of this invention are made by reacting 2,6-diphenylphenol or 2,6-diphenylthiophenol with the desired aldehyde or ketone in an acidic liquid phase in which the reactants are soluble and which is nonreactive with the other components, containing no more than 5 percent water and whose acid strength, as measured on the Hammett $H_o$ scale, is at least as strong as trifluoroacetic acid. On the Hammett $H_o$ scale, the values are called Hammett $H_o$ acidity functions and range from positive to negative numbers. The more negative the value, the stronger the acid. For a more complete discussion of the Hammett $H_o$ acidity functions, reference is made to the book "Acidity Functions" by Colin H. Rochester, Academic Press, New York (1970). This book and its references are hereby incorporated by reference for a teaching concerning acidity functions of various acids and the factors which govern acidity functions of various systems in which the acids are dissolved. The liquid phase can be either the neat acid having the required acid strength or it can be an inert organic liquid in which the acid is dissolved in sufficient quantity to give the desired acid strength.

Preferably, the liquid phase should be a solvent in which the amount of both reactants used are completely soluble. However, this is not a requisite, and heterogeneous reaction mixtures can be used when the reactants are sufficiently soluble in the liquid phase to give a reasonable reaction rate. Preferably, any inert organic liquid used as a diluent and solvent for the acid should be aprotic and should have high dielectric constant since such a solution will have a higher negative Hammett $H_o$ activity function for a given acid than a solvent having a lower dielectric constant.

Typical examples of acids that are readily available which can use to provide the required acidity are: hydrogen fluoride, trifluoracetic acid, mono-, di- and hexafluorophosphoric acids, fluoboric acid, methanesulfonic acid, trifluoromethanesulfonic acid, etc. Mixtures of these acids can be used but offer no advantage over the use of a single acid.

If desired, the acids, especially those having a very high negative Hammett $H_o$ activity function, can be diluted with a wide variety of organic liquids to provide the liquid phase still having the requisite acidity. As is self-evident, the diluent should not be reactive with either the acid or reactants and must be miscible with the acid. Preferably, but not necessary, the diluent should increase the solubility of the reactants in the liquid phase. Aprotic solvents having a high dielectric constant are the preferable diluents to use. Examples of readily available organic liquids we can use are: nitromethane, sulfolane, chloroform, chlorobenzene, o- or m-dichlorobenzene, the chlorotoluenes, nitrobenzene, etc. The particular solvent is not critical and its choice is dependent on the desires of the operator.

The ketones and aldehydes we can use are those having the general formula

where $R_1$ and $R_2$ are the same as defined for the products. Typical examples of lower alkyl groups which $R_1$ and $R_2$ can be are: methyl, ethyl, propyl, isopropyl, the various butyl isomers, i.e., n-butyl, sec-butyl, 2-methylpropyl, cyclobutyl, etc., the various pentyl isomers, the various hexyl isomers, the various heptyl isomers and the various octyl isomers. $R_1$ and $R_2$ together with the carbon to which they are attached can be a cyclohexyl ring including a lower alkyl substituted cyclohexyl ring, i.e., the ketone used is a cyclohexanone as contrasted to a cyclohexyl ketone or aldehyde which would result in either $R_1$ or $R_2$ or both each being a cyclohexyl group which can be substituted with one to five preferably one or two lower alkyl groups, i.e., the lower alkyl groups disclosed above. In addition, $R_2$ but not $R_1$ can be phenyl or phenyl substituted with one to five, preferably one to two lower alkyl groups, i.e., the lower alkyl groups previously disclosed and, when 2,6-diphenylthiophenol is used, and $R_1$ is hydrogen, $R_2$ can be carboxyl, i.e., the carbonyl reactant is glyoxylic acid.

As is evident, water is a product of the dibenzopyran and dibenzothiopyran forming reaction. Therefore, the reaction is aided by using anhydrous liquid phase initially or at least limiting the amount of water present initially to no more than 5 percent by volume. This also aids since the acidity of such systems is higher than when more water is present. Azeotropic distillation, use of inert desicants, etc., can also be used to remove the water of reaction.

The rate of reaction of the aldehyde or ketone with 2,6-diphenylphenol or 2,6-diphenylthiophenol is governed by the acidity of the organic reaction medium. The stronger the acidity, the faster the reaction. Likewise, heating will also speed up the rate of reaction. In the case of 2,6-diphenylphenol, the initial product is a dibenzopyran. Longer reaction times, higher temperatures or increased acidity of the reaction medium favors the isomerization of the dibenzopyran to the corresponding fluorenol. This fluorenol can further react if an excess of ketone or aldehyde is present to form a pyran ring between the phenyl substituent in the position ortho to the phenolic hydroxyl group in the fluorenol in the same way as the initial pyran ring was formed with the 2,6-diphenylphenol. This indenoyldibenzopyran can likewise be isomerized to an indenoylfluorenol. Such reactions are further disclosed and claimed in our copending application Ser. No. 147,163, referenced above.

In preparing the compounds of this invention to suppress the further reaction, we prefer, when heating the reaction mixture, to use trifluoroacetic acid as the solvent medium with 2,6-diphenylphenol since this has the minimum acidity required and minimizes the formations of these further reaction products. Methanesulfonic acid is a good acid to use for reactions run at room temperature. In order to prepare the fluorenol compounds of this invention in highest yields and purity, we prefer to first form the dibenzopyran precursor and isolate it from the reaction mixture and then isomerize it in the absence of the aldehyde or ketone using any of the acidic media previously described, or, if desirable, Lewis acids, for example, $AlCl_3$, $BF_3$ in trifluoroacetic acid, etc., can be used for the isomerization. In this way, the dibenzopyran can be converted completely into the desired fluorenol without causing any production of the higher condensed products.

Surprisingly enough, the dibenzothiopyrans of this invention do not isomerize to the corresponding fluorenthiols. With these compounds, we therefore can use reaction media having higher acidity than trifluoroacetic acid with no danger of isomerization occurring. However, the 2,6-diphenylthiophenol reacts quite rapidly with aldehydes and ketones and therefore trifluoroacetic acid is generally a convenient material to use as both acid and solvent. However, as will be illustrated in the examples, other acidic media having a higher acidity for example methanesulfonic acid alone or diluted with an inert solvent such as chlorobenzene, chloroform, etc., can be used.

In order that those skilled in the art may better understand our invention, the following examples are given by way of illustration and not by way of limitation. In all the examples, parts are by weight and temperatures are in degrees Centigrade unless otherwise specifically noted. Where elemental analyses are given for a named compound, the theoretical values calculated for this compound, are given in parentheses after the analytically determined values.

EXAMPLE 1

A solution of 370 g. of 2,6-diphenylphenol in two l. of trifluoroacetic acid was heated to reflux and 174 g. of acetone was added over a 10 minute period. After refluxing for 5.5 hours an additional 87 g. of acetone was added and reflux continued for an additional 0.5 hour. On cooling to room temperature, the crude 4-phenyl-6,6-dimethyl-4-phenyl-6H-dibenzo[b,d]pyran, corresponding to formula A where X is oxygen and $R_1$ and $R_2$ are each methyl, precipitated as a crystalline material which was filtered, washed with water and air dried. The product was dissolved in one l. of heptane containing 150 ml. of toluene. The solution was extracted three times with 300 ml. portions of Claisen's alkali to remove any phenolic bodies. After washing with water and drying with anhydrous magnesium sulfate, the solvent was removed under vacuum from the extracted heptane-toluene solution leaving a solid residue which was recrystallized from methanol to yield 281 g. of the purified dibenzopyran as white crystals having a melting point of 79°, whose structure was confirmed by infrared, nmr and mass spectro-metry. Elemental analysis: C, 87.8 (88.1); H, 6.5 (6.3).

EXAMPLE 2

A solution of 260 g. of the dibenzopyran produced in Example 1, in one l. of trifluoroacetic acid was heated at reflux for 11 days. After cooling to room temperature, 500 ml. of water and 500 ml. of heptane were added causing a precipitate to form. Filtration yielded 46 g. of crystalline 9,9-dimethyl-3-phenyl-4-fluorenol, corresponding to formula B where $R_1$ and $R_2$ are each methyl, which was washed with water and dried under vacuum. The heptane layer was extracted three times with Claisen's alkali and the alkali extracts combined and neutralized with aqueous hydrochloric acid to cause additional amounts of the fluorenol to precipitate. It was recovered by filtration, washed with water and dried in a vacuum to yield an additional 71 g. of the above-named fluorenol whose formula is that of the fluorenols previously given wherein $R_1$ and $R_2$ are each methyl. The total yield was 117 g. having a melting point of 106°–107°, and whose structure was confirmed by infrared, nmr and mass spectrometry. Elemental analysis showed: C, 88.2 (88.1); H, 6.1 (6.3).

Isomerization of the dibenzopyran to the fluorenol was also effected by heating a solution of 1 g. of the dibenzopyran of Example 1, in 15 ml. of chlorobenzene at 80° for 17 hours in the presence of 40 mg. of aluminum chloride. Isomerization could also be effected with other very strongly acidic media, for example, methanesulfonic acid, liquid anhydrous HF, etc., or other Lewis acids, for example $BF_3$ in trifluoroacetic acid, etc. The fluorenol could also be isolated from the Claisen's alkali extraction layer of Example 1 by neutralization as described above in Example 2.

EXAMPLE 3

A solution of 246 g. of 2,6-diphenylphenol in 1,250 ml. of trifluoroacetic acid was heated to reflux and 200 g. of cyclohexanone added. After only 30 minutes of reaction at reflux there was a copious precipitate of spiro cyclohexane-1′,6-(4′-phenyl-6H-dibenzo[b,d]pyran) which was isolated by filtration of the hot reaction mixture and washed three times with water and dried in vacuum. After recrystallization from isopropanol, there was obtained 200 g. of the dibenzopyran as a white crystalline product having a melting point of 124°–125°, whose structure (corresponding to formula A where X is oxygen and $R_1$ and $R_2$ together with the carbon atom to which they are commonly attached, forms the cyclohexyl group) was confirmed by infrared, nmr and mass spectrometry. Elemental analysis showed: C, 88.1 (88.3); H, 6.8 (6.8).

EXAMPLE 4

A solution of 150.1 g. of 2,6-diphenylphenol in one l. of trifluoroacetic acid was heated to reflux and 26.7 g. of paraldehyde added over a 15 minute interval. After refluxing for one hour, the solution was cooled, quenched with water and extracted with chloroform. The chloroform solution was washed with water, dried over anhydrous sodium sulfate and filtered. After removal of the chloroform under vacuum, the crude 6-methyl-4-phenyl-6H-dibenzo[b,d]pyran, corresponding to the formula A where X is oxygen, $R_1$ is hydrogen and $R_2$ is methyl, was obtained as a brown oil. The oil was dissolved in a minimum amount of benzene and hexane added. The solution was extracted five times with 100 ml. portions of Claisen's alkali after which the benzene-hexane solution was washed with water, dried and filtered. Removal of the solvent under vacuum, yielded 143.6 g. of the product as a clear brown oil which was found by glc to be 81.3 percent of the desired dibenzopyran and 18.7 percent of a second product. The pure dibenzopyran was isolated by fractional distillation in an 18 inch spinning band column at less than 1 millimeter pressure. The liquid fraction collected at 180°–190° when treated with hexane produced white crystals of the pure product having a melting point of 61°C–62° C., whose structure was confirmed by infrared and nmr spectroscopy. An elemental analysis showed: C, 88.0 (88.3); H, 6.0 (6.0). Molecular weight: 286 (272).

EXAMPLE 5

A solution of 100 g. of 2,6-diphenylphenol and 135 g. of benzaldehyde in 125 ml. of chloroform and 500 ml. of trifluoroacetic acid was maintained at 30° for 65 hours. During this time, 4,6-diphenyl-6H-dibenzo[b.d]pyran, corresponding to formula A where X is oxygen, $R_1$ is hydrogen and $R_2$ is phenyl, precipitated from the reaction mixture. It was washed two times with trifluoroacetic acid three times with water and air dried. After recrystallization from ethanol, there was obtained 51.5 g. of the dibenzopyran as a white crystalline solid having a melting point of 102°–103°, whose structure was confirmed by infrared and nmr spectroscopy. Elemental analysis showed: C, 89.6 (89.8); H, 5.4 (5.4).

EXAMPLE 6

A suspension of 15 g. of 2,6 -diphenylphenol in 150 ml. of trifluoroacetic acid was heated to 50° and 7.07 g. of propanal (propionaldehyde) added. After one hour reaction at this temperature, the reaction mixture was quenched with water and extracted with benzene. The benzene layer was washed with water, diluted with hexane and extracted three times with 100 ml. portions of Claisen's alkali. After washing with water and drying over anhydrous sodium sulfate and filtering, the solvent was removed from the benzenehexane layer yielding 13.33 g. of 6 -ethyl-4-phenyl-6H-dibenzo[b,d]pyran, corresponding to formula A where X is oxygen, $R_1$ is hydrogen and $R_2$ is ethyl, as a yellow oil which was shown by glc to be 78 percent of the desired dibenzopyran. Preparative glc was used to isolate the pure product as a yellow liquid whose structure was confirmed by infrared, nmr and ultraviolet spectrometry. Elemental analysis showed: C, 88.5 (88.1); H, 6.4 (6.3).

EXAMPLE 7

A suspension of 5 g. of 2,6-diphenylthiophenol and 140 ml. of trifluoroacetic acid was heated to reflux and 5.8 g. of acetone added. The reaction mixture became pink and homogeneous after 2 minutes and after 5 minutes a clear oil had formed. After a total reaction time of 35 minutes, the mixture was cooled to room temperature and the solids which had precipitated, were filtered, washed several times with water and dried under vacuum at 50°. The crude product, 6,6-dimethyl-4-phenyl-6H-dibenzo[b,d]thiopyran, corresponding to formula A where X is sulfur, $R_1$ and $R_2$ are both methyl, weighed 5.64 g. and was found by glc to be greater than a 99 percent pure. Recrystallization from ethanol yielded white prisms of the product having a melting point of 124°–125° whose structure was confirmed by infrared, nmr and mass spectrometry. Elemental analysis showed: C, 83.2 (83.4); H, 6.1 (6.0).

EXAMPLE 8

A suspension of five g. of 2,6-diphenylthiophenol in 140 ml. of trifluoroacetic acid was heated to reflux and 5.9 g. of cyclohexanone was added. The reaction mixture became homogeneous in 2 minutes. After refluxing for 2 hours and cooling to room temperature, the precipitate of the spiro cyclohexane-1',6-(4-phenyl-6H-dibenzo[b,d]thiopyran) corresponding to formula A where X is sulfur and $R_1$ and $R_2$, together with the carbon atom to which both are attached, form the cyclohexyl group, was isolated by filtration, washed several times with water and vacuum dried at 50° yield 6.1 g. After recrystallization from benzeneisopropanol the product was obtained as white prisms having a melting point of 177°–178° whose structure was confirmed by infrared and nmr spectrometry. Elemental analysis showed: C, 84.2 (84.2); H, 6.6 (6.5). Molecular weight: 341 (342).

EXAMPLE 9

A solution of three g. of 2,6-diphenylthiophenol in 63 ml. of trifluoroacetic acid was heated to reflux and 0.896 g. of glyoxylic acid added in small portions over a period of 5.5 hours. The reaction mixture was diluted with 200 ml. of chloroform, washed four times with water and dried over anhydrous sodium sulfate and filtered. The solvent was evaporated to yield 3.73 g. of crude 6-carboxy-4-phenyl-6H-dibenzo[b,d]thiopyran, corresponding to formula A where X is sulfur, $R_1$ is hydrogen and $R_2$ is carboxyl. It was recrystallized from toluene to yield 0.557 g. of white crystals of the desired dibenzothiopyran having a melting point of 201°–203° whose structure was confirmed by infrared and nmr spectrometry. Elemental analysis showed: C, 75.7 (75.5); H, 4.7 (4.4); S, 9.7 (10.0).

EXAMPLE 10

A mixture of 3 g. of 2,6-diphenylthiophenol and 2 g. of benzaldehyde in 10 ml. of methanesulfonic acid and 20 ml. of chlorobenzene was shaken vigorously for 15 minutes at room temperature. Analysis by glc showed the reaction was complete in this short time. The acid and chlorobenzene layers were separated and the acid layer extracted with chloroform. The chloroform layer was combined with a chlorobenzene layer, washed several times with water and the solvent removed by heating under vacuum. The solid residue weighing 3.8 g. was found by glc and tlc to be essentially pure 4,6-diphenyl-6H-dibenzo[b,d]thiopyran, corresponding to formula A where X is sulfur, $R_1$ is hydrogen and $R_2$ is phenyl. After recrystallization from acetonitrile, this product was obtained as yellow crystals having a melting point of 162°–162.5° whose structure was confirmed by infrared, nmr and mass spectrometry. Elemental analysis showed: C, 85.6 (85.7); H, 5.3 (5.2).

EXAMPLE 11

A mixture of 1 g. of 2,6-diphenylthiophenol and 1 g. acetophenone in 5 ml. of methanesulfonic acid and 6 ml. of chlorobenzene was shaken vigorously for 5 hours at room temperature. After separating the acid layer from the chlorobenzene layer, it was extracted with 5 ml. of chlorobenzene and the two chlorobenzene layers combined. After washing with water, the chlorobenzene was removed under vacuum giving 1.35 g. of essentially pure 6-methyl-4,6-diphenyl-6H-dibenzo[b,d]thiopyran which, after recrystallization from methanol, was a white crystalline solid having a melting point of 139°–139.5° whose structure, corresponding to formula A where X is sulfur, $R_1$ is methyl and $R_2$ is phenyl, was confirmed by infrared, nmr and mass spectrometry. Elemental analysis showed: C, 85.6 (85.7); H, 5.6 (5.5).

As discussed previously, the dibenzopyrans can either be isomerized to their fluorenols or the pyran ring, like the thiopyran ring can be cleaved so that the dibenzopyran and dibenzothiopyrans of this invention can be converted to 2,6-diphenylphenols in which one of the phenyl substituents is itself substituted in its ortho position with a substituent which is dependent upon the aldehyde or ketone used initially in making the pyran. This cleavage can be accomplished either chemically or electrochemically and is preferably carried out electrochemically for the thiopyrans. The spirodibenzopyrans likewise can be dehydrogenated, for example with palladium catalyst on carbon, which simultaneously converts the cyclohexyl group to a phenyl group and cleaves the pyran ring to produce a 2,6-diphenylphenol in which one of the phenyl substituents is likewise substituted in the ortho position with the phenyl group i.e., the phenol is 2-(2-biphenylyl)-6-phenylphenol. These phenols and thiophenols as well as the fluorenols are phenolic bodies which can be used as stabilizers and antioxidants to prevent polymerization of polymerizable monomers as well as additives for lubricating oils to impart antioxidation properties to the lubricants.

The above examples have shown some of the variations which are possible with our invention. Other obvious variations will be apparent to those skilled in the art in light of the above teachings. For example, other ketones and other aldehydes within the scope of the disclosure can be substituted for the particular aldehydes and ketones specifically used. The dibenzopyrans can all be isomerized to their corresponding fluorenols. All such variations are within the full intended scope of the invention as defined by the appended claims.

What we claim as new and desire to secure by Letters Patent of the United States is:

1. A dibenzopyran or a dibenzothiopyran having the formula,

A.

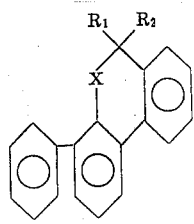

or a fluorenol isomer of a dibenzopyran of A having the formula,

B.

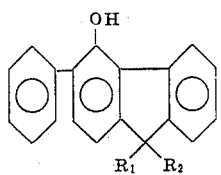

where X is oxygen or sulfur, $R_1$ and $R_2$, taken together, with the carbon atom to which both are attached form the cyclohexyl ring or lower alkyl cyclohexyl ring and, in addition, individually, $R_1$ is hydrogen, cyclobutyl or lower alkyl free of a tertiary-$\alpha$-carbon atom and $R_2$ is cyclobutyl, lower alkyl free of a tertiary-$\alpha$-carbon atom, phenyl, phenyl substituted with from 1 to 5 lower alkyl groups and, when X is sulfur and $R_1$ is hydrogen, carboxyl.

2. A compound of claim 1, where $R_1$ is hydrogen and $R_2$ is lower alkyl.

3. A compound of claim 1, where $R_1$ is hydrogen and $R_2$ is phenyl.

4. A compound of claim 1, where both $R_1$ and $R_2$ are lower alkyl.

5. A compound of claim 4, where both $R_1$ and $R_2$ are methyl and X is oxygen.

6. A compound of claim 5, having formula A.

7. The compound of claim 4, where $R_1$ and $R_2$ are each methyl and X is sulfur.

8. A compound of claim 1, where X is oxygen and $R_1$ and $R_2$, together with the carbon atom to which both are attached, form the cyclohexyl ring.

9. The compound of claim 8, having formula A.

10. The compound of claim 1, where X is sulfur and $R_1$ and $R_2$, together with the carbon atom to which both are attached, form the cyclohexyl ring.

11. A compound of claim 1, where $R_1$ is methyl, $R_2$ is phenyl and X is oxygen.

12. The compound of claim 11, having formula A.

13. The compound of claim 1, where $R_1$ is methyl, $R_2$ is phenyl and X is sulfur.

14. The compound of claim 1, where $R_1$ is hydrogen, $R_2$ is carboxyl and X is sulfur.

* * * * *

UNITED STATES PATENT OFFICE
CERTIFICATE OF CORRECTION

Patent No. 3,723,465     Dated March 27, 1973

Inventor(s) Walter L. Hall and Jimmy L. Webb

It is certified that error appears in the above-identified patent and that said Letters Patent are hereby corrected as shown below:

IN THE TITLE: change "IBENZOTHIOPYRANS" to - DIBENZOTHIOPYRANS -; Column 3, line 26, cancel "isomers" and insert - groups, both acyclic and cyclic -; line 28, in both occurrences cancel "isomers" and insert - groups -; lines 13-14, cancel "substituted with from 1 to 5 lower alkyl groups" and insert - substituted with from 1 to 5 acyclic $C_{1-8}$ alkyl or cyclic $C_{4-8}$ alkyl groups -; Claim 2, line 2, cancel "lower" and insert - acyclic $C_{1-8}$ -; Claim 4, line 2, cancel "lower" and insert - acyclic $C_{1-8}$ -.

Signed and sealed this 29th day of January 1974.

(SEAL)
Attest:

EDWARD M. FLETCHER, JR.
Attesting Officer

RENE D. TEGTMEYER
Acting Commissioner of Patents